Figure 1:
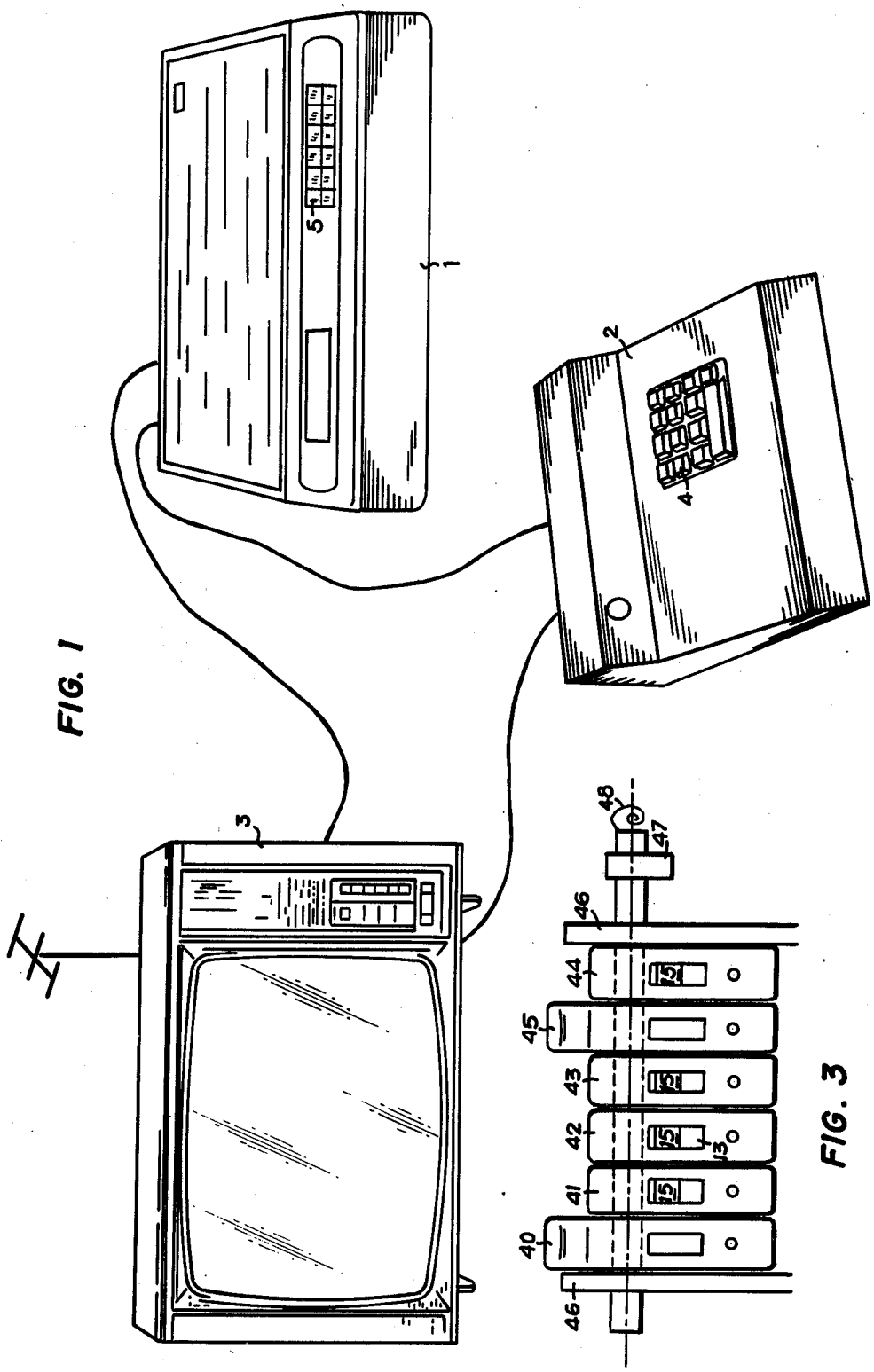

United States Patent [19]

Gautier et al.

[11] 4,156,881

[45] May 29, 1979

[54] ELECTRO-MECHANICAL DEVICE FOR CONTROLLING A MAGNETIC RECORDER

[75] Inventors: Christian J. Gautier, Acigne; Gilbert M. Gaucher, Chateaugiron; Gabriel R. Degoulet, Guignen, all of France

[73] Assignees: Etablissement Public de Diffusion dit "Telediffusion de France", Montrouge, France; L'Etat Francais, represente par le Secretaire d'Etat aux Postes et Telecommunications (Centre National d'Etudes des Telecommunications), Issy-Les-Moulineaux, France

[21] Appl. No.: 744,125

[22] Filed: Nov. 22, 1976

[30] Foreign Application Priority Data

Nov. 28, 1975 [FR] France ............................... 75 37200

[51] Int. Cl.² ...................... G11B 15/10; G11B 15/02
[52] U.S. Cl. ......................................... 360/61; 335/73
[58] Field of Search ........................... 335/73, 74, 75; 360/61–64, 137, 33, 71–74; 197/17, 19; 74/22 A, 84 R, 122

[56] References Cited

U.S. PATENT DOCUMENTS

| 3,198,906 | 8/1965 | Frink | 335/73 |
| 3,512,784 | 5/1970 | Yamamoto | 335/73 |
| 3,642,110 | 2/1972 | Hishida et al. | 197/17 |
| 3,768,623 | 10/1973 | Asahi | 197/17 |
| 3,972,071 | 7/1976 | Arrington | 360/62 |
| 4,031,334 | 6/1977 | Kimura | 360/61 |

FOREIGN PATENT DOCUMENTS 2102300 8/1972 Fed. Rep. of Germany.
7438316 6/1975 France.

Primary Examiner—Jay P. Lucas
Attorney, Agent, or Firm—Bierman & Bierman

[57] ABSTRACT

An arrangement for the electrical control of the keyboard of a video or audio tape recorder includes electromechanical levers acting on the usual rod system associated with the keyboard in substitution of the conventional keys. The levers are essentially bellcranks and are associated with tumblers and electromagnets.

4 Claims, 16 Drawing Figures

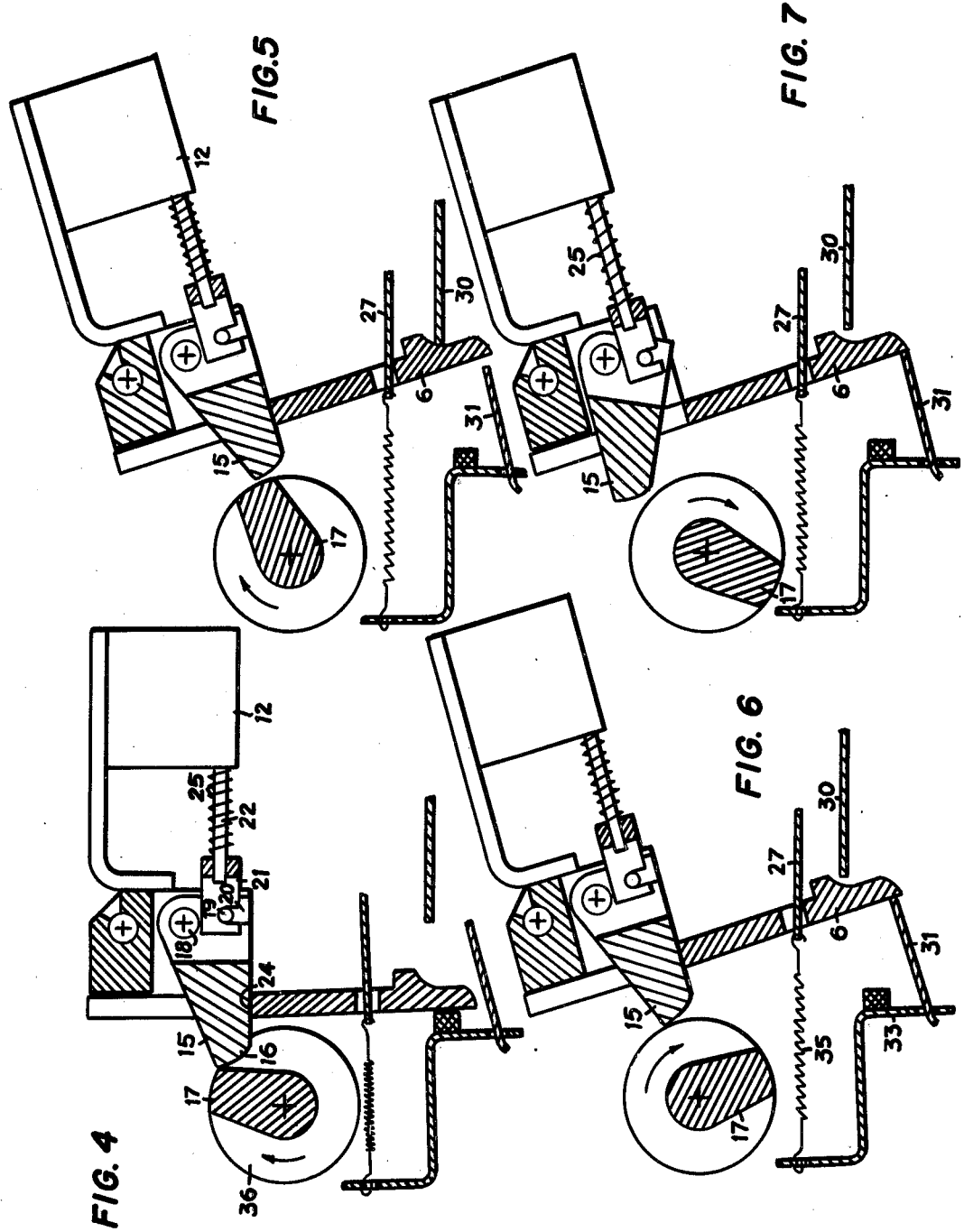

ELECTRO-MECHANICAL DEVICE FOR CONTROLLING A MAGNETIC RECORDER

The present invention relates to an arrangement for the electrical control of the operating keys of an audio or a video tape recorder. The invention is particularly, though not exclusively, applicable to audio or video tape recorders for use by the general public.

At present, audio or video tape recorders for use by the public generally have manually operated keyboards which have six keys, namely: a cassette-ejection key, a record key, a rewind key, a playback key, a wind-on or fast forward key and a stop key. These keys are commonly arranged to pivot, when actuated by the finger, about a common axis. Each of the keys is provided with a tail which, during the rotation about the common axis, moves parts of a rod system which enables the apparatus to perform the required function, e.g. recording, or sound or vision playback. Some of these parts of the rod system also have the purpose, for reasons of safety, of preventing the simultaneous depressing of two keys, except for the simultaneous depressing of the record key and the playback key in order to perform the recording function. Other parts may be provided in the rod-system, such as a locking bar, which locks the operated key in the depressed position in order to eliminate the need for keeping it pressed down with the finger. The depressing of the stop key has the effect of moving this locking bar in order to release any key or keys previously depressed. Generally, a further part of the rod system is also actuated in order to confirm that the depressing of a key has been sufficient to enable the function concerned to be performed, this further part actuating, in particular, a final operational contact. In the depressed position, each contact is, of course, subject to the action of a return spring tending to bring it back to its initial position.

It has been found, particularly with regard to television transmissions, that many users are not available at the time of certain transmissions which might have been of interest to them to record the transmissions. To remedy this drawback it is possible to make provision for the recording of the desired transmission on a tape recorder which reproduces the transmission (audio or visual) when the user is available. As it is not economically conceivable to record all transmissions, certain known video tape recorders are fitted with a preset clock which, at an indicated time, starts recording a transmission and which, at the end of a period which has also been pre-set, stops the recording. This system only makes it possible to obtain one listening period, which must be synchronous with that of the desired transmission. Generally, at the end of the recording, the apparatus is turned off.

There are other systems, for example that described in French patent application No. 75 18319 filed on 6th June 1975 in the name of "Telediffusion de France" and "l'Etat Francais" and entitled "Systeme de diffusion de donnees", corresponding to U.S. Pat. application Ser. No. 689,493, filed June 3, 1976 in the name of Guinet et al. and entitled "One Way Data Transmission System" now U.S. Pat. No. 4,058,830 which makes it possible to transmit to terminal equipment, side by side with television pictures, coded data which are invisible to a TV viewer, but which identify the transmission in progress by a kind of label. In these systems a subscriber to this special service has a terminal equipment, a video tape recorder and a television receiver; he programs in advance on the terminal equipment those transmissions which he wishes to have recorded on his video tape recorder according to the labels; and he then selects, still by means of the terminal equipment, the transmissions recorded on the video tape recorder which he wishes to see on the screen of his receiver. Consequently, the terminal equipment must be capable, several times, without any manual action by the subscriber on the video tape recorder, of actuating the latter by electromechanical means in order to obtain all the functions usually brought about manually.

One feature of the present invention is the provision of an electro-mechanical device which can replace the keyboard of an audio tape recorder or a video tape recorder, this device performing all the functions normally performed by the keys of the keyboard and making it possible to keep all the parts of the control rod system practically unchanged, the device being controlled from a remote control set or a terminal equipment, such as that mentioned above, which give it orders in the form of electrical signals.

A further feature of the invention is the provision of an electro-mechanical device having as many levers as the keys of an original keyboard, the levers being able to turn about an axis which is practically identical with that of the original keys, each lever acting on the rod system like the tail of a key.

It is quite obvious that, in order to cause levers, such as those just referred to, to pivot around the axis of a lever, use could be made of electro-magnets whose armatures would directly actuate the levers. However, the forces required in order to move the whole of the rod system at once and overcome the return force of each return spring are very great, as one can confirm for oneself by operating a video or audio tape recorder key-board. Electro-magnets capable of developing such forces would be too large and, in any case, incompatible with the transverse dimensions of the levers which are mounted side by side for practical purposes.

Electro-mechanical devices for the control of a video or audio tape recorder are already known, which perform the standard control functions of a standard keyboard of a video or audio tape recorder and which have, in the place of certain keyboard keys, a lever in the form of a right-angled piece or bellcrank capable of being rotated about a first axis, the vertically extending branch of the right-angled piece of the lever serving, like the tail of a classical key, to actuate a rod system of a video or audio tape recorder and being carried along in the last part of its travel by a coupling. Such devices are described, in particular, in German Pats. No. 1,572,526 and No. 1,772,941. However, in the first patent referred to, the lever, before being carried along by a coupling, is directly actuated by an electro-magnet which therefore must initially have, as indirect-action devices, sufficient power to overcome the forces encountered during the manual depressing of a key. The electro-magnet therefore has to be of considerable size. In the second patent referred to, another type of coupling is provided with lateral movement; however, no control by electro-magnet is provided.

One feature of the invention is to provide an electro-mechanical device of this type, the size of which is compatible with the dimensions of an ordinary keyboard of a video or audio tape recorder.

According to one characteristic feature of the invention, there is provided an electro-mechanical device for the control of a video or audio tape recorder which performs the standard control functions of a standard keyboard of a video tape audio tape recorder which has, in place of certain keyboard keys, a lever in the form of a right-angled piece or bellcrank which can be rotated about a first axis, the normally vertical branch of the right-angled structure of the lever serving, like the tail of a standard key, to actuate a rod system of a video or audio tape recorder, in which a tumbler, also in the form of a right-angled piece or bellcrank, can be rotated about a second axis, parallel to the first axis, of the lever which is slightly below the first axis, the normally vertical branch of the tumbler being attached to the stem of a plunger-core electro-magnet mounted below the horizontal branch of the lever extending towards the rear, the horizontal branch of the tumbler extending towards the front and being provided with an end projecting in front of the normally vertical branch of the lever, a cam which is capable of being rotated about a third axis, parallel to the first two, when it is actuated by an electric motor, the tumbler being capable of being rotated about the second axis in order to assume an operating position when the electro-magnet is energised with its projecting end being lowered when entering the zone of action of the cam, which, as it rotates, pushes away the said end of the tumbler which carries the said lever along by means of a stop integral with the lever, the said lever, which turns around the first axis in order to reach an operating position being locked by a locking bar, an operating position in which the cam ceases to push the end of the tumbler, which is also in an operating position, the tumbler being able to pivot, in the reverse direction, under the action of a return spring, when the electro-magnet is no longer energised, with its projecting end out of the zone of action of the cam, whether the lever is in the operating or rest position, and the lever being brought back to its rest position when the locking bar is unlocked.

According to another characteristic feature of the invention, the plunger-core electro-magnet is energised only between the placing of the tumbler in the operating position, the lever being in the rest position, and the locking of the lever, in the operating position.

According to yet another characteristic feature of the invention, when the lever turns, a first axle is rotated, without causing the other levers to rotate, the first axle having a contact element which closes a stop circuit on encountering another fixed contact element when a lever has reached its operating position, and the electric motor driving the cam completing its operating cycle when the stop circuit is closed, the energisation of the electro-magnet triggering the start of the electric motor, the cycle of which thus corresponds to one revolution of the cam.

According to a further characteristic feature, the cams which are capable of driving the tumblers of the levers are mounted on a common third axle and are driven by a single electric motor.

According to yet a further characteristic feature of the invention, the closing of a stop circuit brings about the release of the electro-magnet for the lever which is locked in the operating position.

Figure 2:
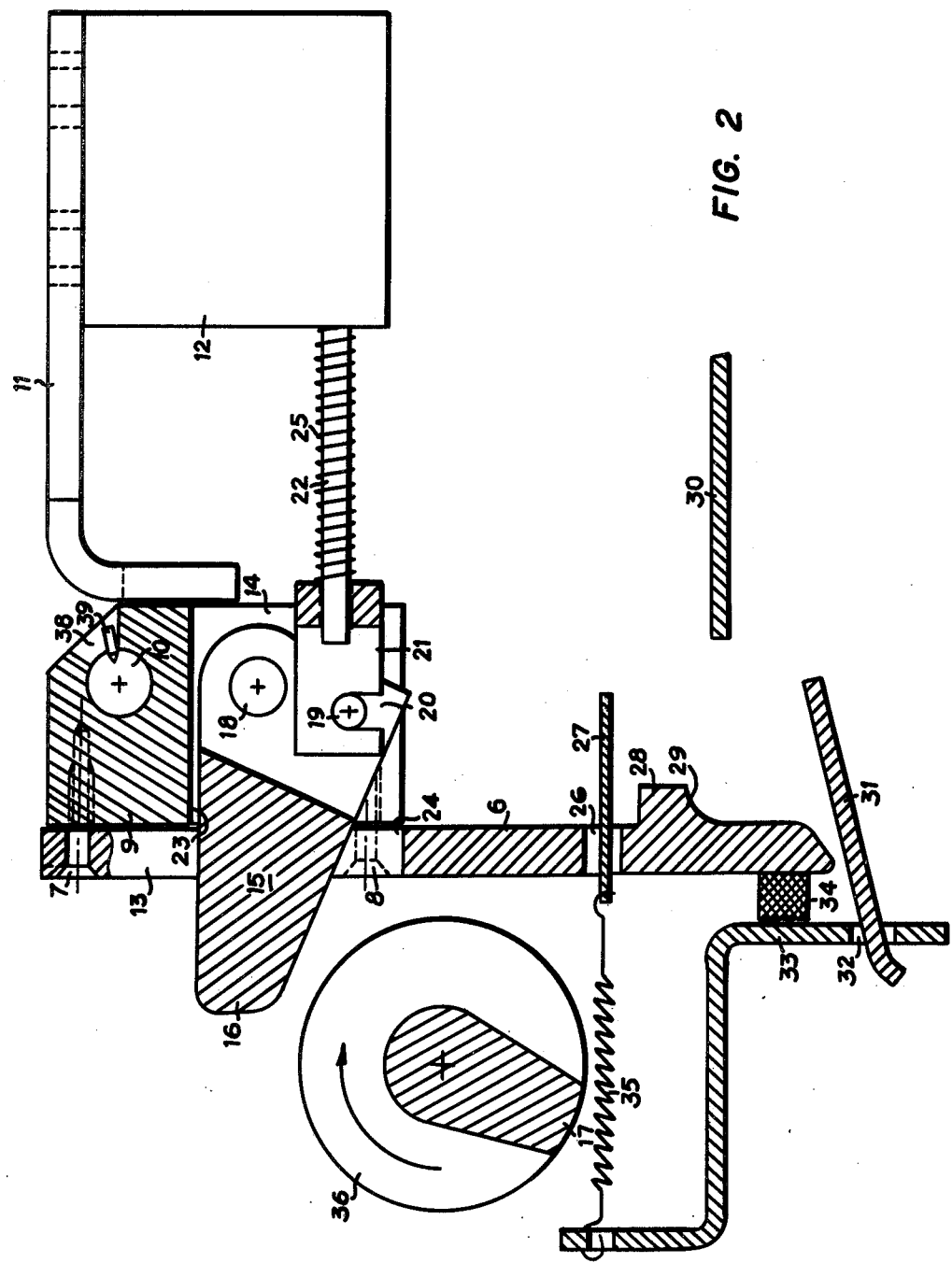
Figure 16:
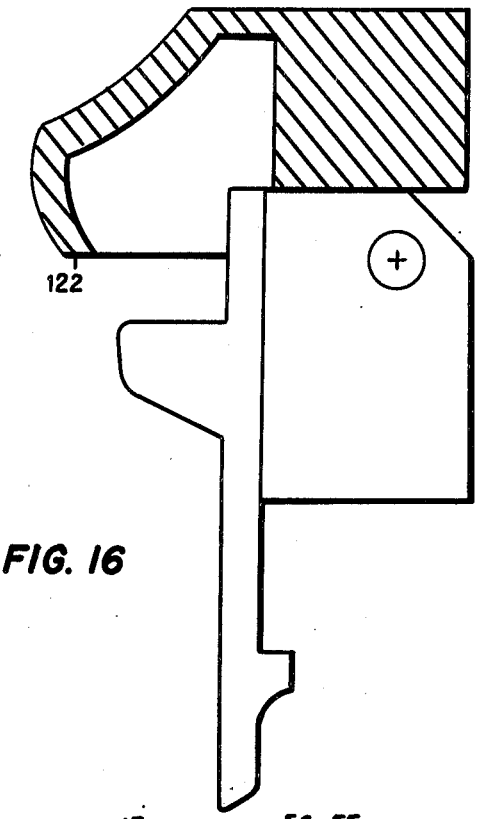
Figure 8:
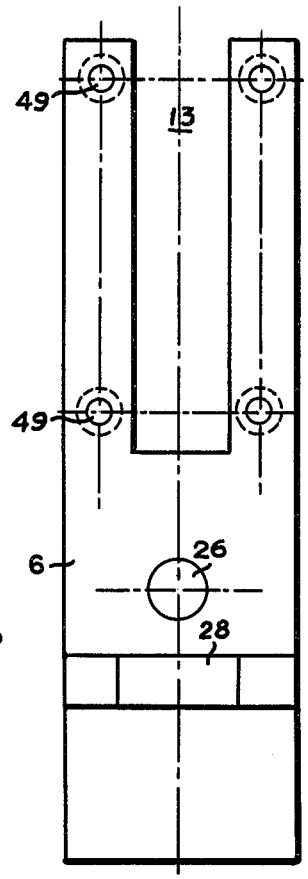
Figure 10:
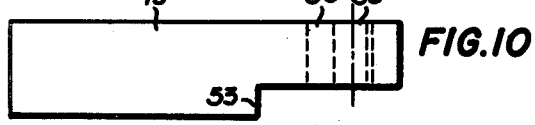
Figures 11, 13:
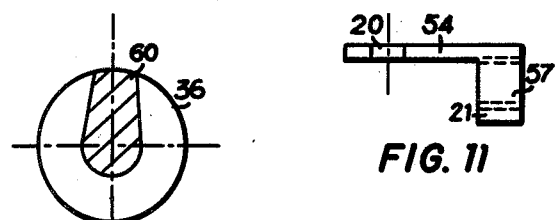
Figure 9:
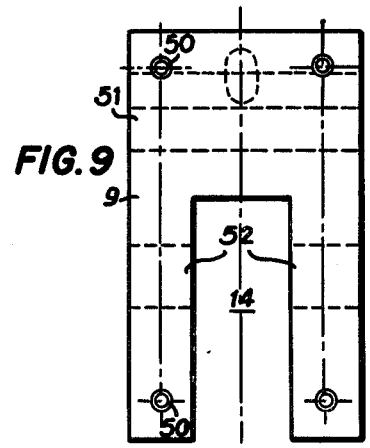
Figure 12:
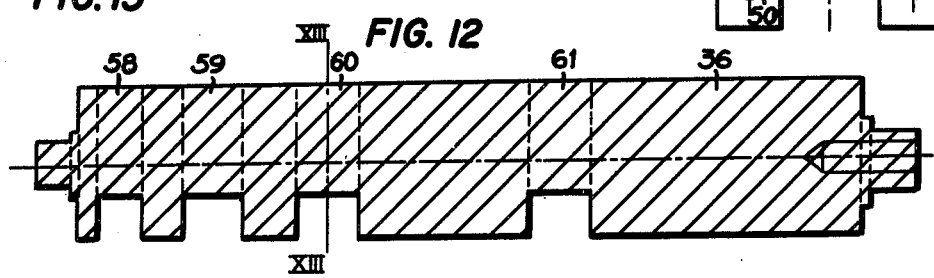
Figure 14:
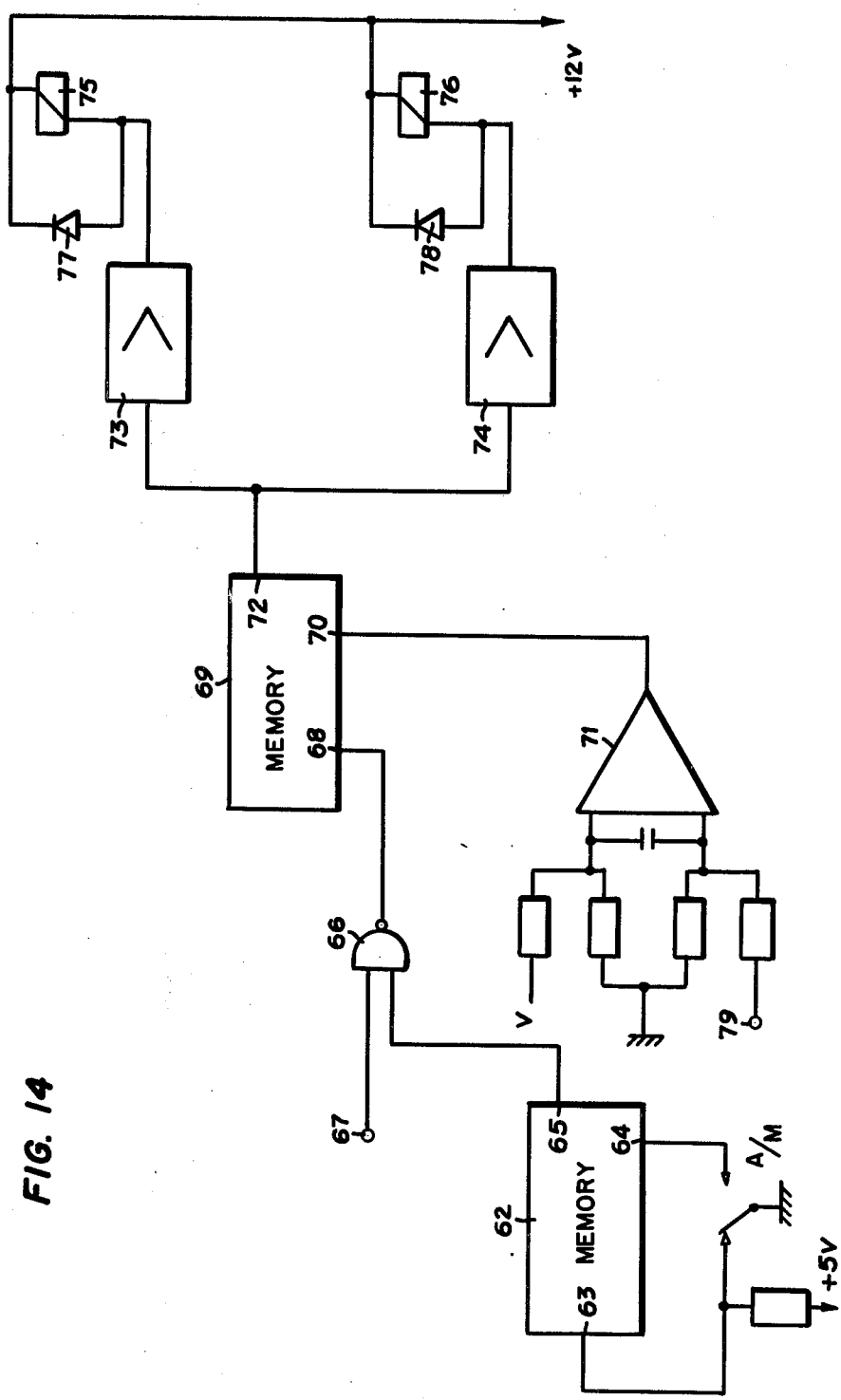
Figure 15:
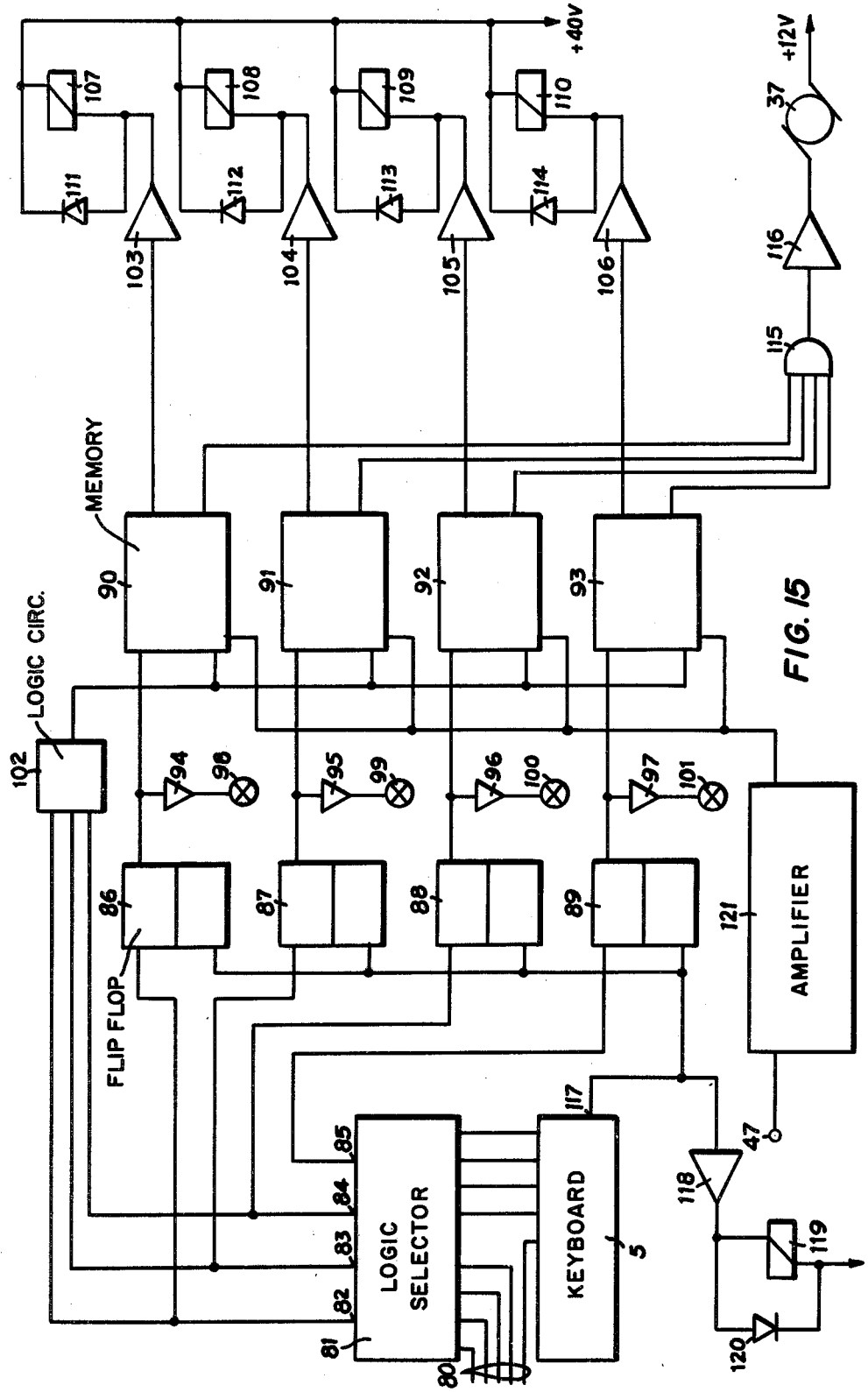

An embodiment of the invention will now be described, by way of example, with reference to the accompanying drawings, in which:

FIG. 1 is a general view, in perspective, illustrating schematically a system for the remote electro-mechanical control of a video tape recorder, FIG. 2 is a vertical cross-section view of a lever and a cam arrangement, the lever and the cam being in the rest position, FIG. 3 is a schematic front view of a set of levers, FIGS. 4 to 7 are vertical cross-sections which illustrate four phases in the bringing into operation of the lever of FIG. 2, FIG. 8 is a view of the rear face of a part forming a vertical branch of the lever of FIG. 2, FIG. 9 is a view of the front face of the part forming a corner of the right-angled structure of the lever of FIG. 2, FIG. 10 is a view from above of a tumbler used in the lever of FIG. 2, FIG. 11 is a view from above of a part whereby the tumbler of FIG. 10 hooks on to the stem of the associated electro-magnet, FIG. 12 is an axial-sectional view of the camshaft of FIG. 2, FIG. 13 is a cross-sectional view of the camshaft of FIG. 12, FIG. 14 is an electrical circuit diagram of the supply circuit for a video tape recorder shown in FIG. 1, FIG. 15 is an electrical circuit diagram of the supply circuit of the electro-magnets of the levers and of the electric motor of the camshaft of FIG. 2, and FIG. 16 is a schematic sectional view illustrating how a lever, according to FIG. 2, can be modified in order to act as a standard keyboard key.

FIG. 1 shows a video tape recorder 1, a remote control box 2 and a television receiver 3, connected with each other in such a way that they constitute a remote control system, in which the box 2 contains, for example, the terminal mentioned in the aforementioned U.S. Pat. application Ser. No. 689,493. The control box 2 is provided with a push-button panel 4 making possible, immediately upon or after reception of a signal indication received by the receiver 3, control of an electromechanical device 5 of the video tape recorder 1, it being possible for the device 5 to have the appearance of an ordinary keyboard, as will be seen subsequently.

The device 5 consists of a series of levers, such as shown in FIG. 2, where a vertical branch or arm 6 is attached as by screws 7 and 8, to a block 9 mounted on an axle or spindle 10. On the rear of the block 9 there is mounted by any suitable means a bracket 11 which carries, on its end, a coil 12 of a plunger-piston electromagnet. The bracket 11 is approximately perpendicular to the branch 6, so that the resulting structure has the appearance of a right-angled lever or bellcrank which can rotate about or with the axle 10. As is shown by FIGS. 8 and 9, the branch 6 and the block 9 have cut-away sections forming respective cavities 13, 14, in which there is accommodated a tumbler 15. The tumbler 15 is a solid part which has a front end 16 having a profile designed to work together with the profile of a rotatable cam 17. Tumbler 15 is pivotally mounted on an axle or spindle 18 mounted between the vertical walls of the hollowed-out part 14 of the body 9, the axle or spindle 18 being parallel to the axle 10. The tumbler 15 carries a cylindrical lug 19 which is engaged in a slot 20 in a yoke 21 connected by a stem 22 to a plunger piston of the electro-magnet 12. Lastly, the rest and operating position of the tumbler 15 are defined by an upper stop 23, consisting of the upper wall of the cavity 14 of the block 9, and a lower stop 24, consisting of the bottom of the hollowed-out part 13 of the branch 6. Around the stem 22, between the yoke 21 and the electro-magnet 12, there is mounted a helicoidal return spring 25.

Like the tail of an ordinary key, the branch 6 has a hole 26 in it opposite to which there is the projecting tongue of a bar 27 enabling the branch 6 to actuate the known rod system (not shown) of the video tape recorder 1; it also has a projecting part 28 having a hollowed-out portion 29 which, when the lever is in the operating position (in FIG. 2 the lever is at rest), runs up against a stop 30. Below the branch 6 there is a locking bar 31 which, at rest, is pulled back upwards by a spring, not shown, and which can pivot in a slot 32 in a plate 33 connected in any suitable manner to the frame of the video tape recorder 1. In front of the branch 6, mounted on the plate 33, there is a stop 34 which limits the movement of the lever in the clockwise direction. Between the frame 33 and the tongue of the bar 27 there is mounted a return spring 35 the purpose of which is to return, by means of the bar 27, both the rod system to the rest position and also the branch 6, carried along by the bar 27.

The cam 17 forms a part of a camshaft 36, FIG. 12, which can rotate about an axle parallel to axle 10, the shaft 36 being driven for rotation by a reducing gear, not shown, which is itself driven by an electric motor, shown schematically at 37 in FIG. 15.

On its rear part, the block 9 has a slot 38 through which a screw 39 is screwed into the axle 10. In the rest position the screw 39 is, in its cylindrical part outside the axle 10, practically in contact with the bottom of the slot 38. When the lever turns anti-clockwise, to pass to the operating position, the screw 39 is carried along by the bottom of the slot 38 and, in turn, causes the axle 10 to rotate. On the other hand, if the axle 10 rotates, under the action of another lever, the screw 39 moves in the notch 38 without carrying along the lever shown.

FIG. 3 shows an ejection key 40, levers 41 to 44 and a stop key 45 for the device. The key 40 controls the ejection of a cassette from the video tape recorder 1, the lever 41 is for high-speed rewind, the lever 42 is for high-speed forward winding, the lever 43 is for starting playback or recording, the lever 44 is for recording and the stop key 45 is for manually stopping the apparatus. In the normal manner, in order to record, it is necessary to actuate together levers 43 and 44. Apart from these two levers, considered together, the rod system of the key operated assembly, prevents the simultaneous operation of two levers, although the stop lever 45 can be actuated in order to cause the other levers to release. As shown in FIG. 3, each lever 41 to 44 has a tumbler 15 which can move in a notch 13 also shown in FIG. 2. The levers are mounted on the common axle 10 supported by plates 46 of a frame. The axle 10 carries a moveable contact element 47. As has been mentioned above, the axle 10 rotates whenever a lever is actuated and then carries along the moving contact 47 which comes into contact with a fixed contact (not shown) in order to confirm in the normal manner that the function designated by the lever can be performed. The axle 10 is further provided with a return spring shown schematically at 48 which returns the axle 10 to the rest position when the levers are all in the rest position. The stop key 45 is not used when the video tape recorder 1 is controlled by the box 2.

A description will now be given, with reference to FIGS. 4 to 7, of the different phases of the moving of a lever to the operating position. It will be seen afterwards how, initially, an electronic circuit brings about the energisation of the motor 37 by turning the cam shaft 36 and the energisation of the electro-magnet 12. It is assumed that, initially, the cam 17 is facing downwards as shown in FIG. 2. The electro-magnet 12 attracts the stem 22 which pulls the yoke 21 which, in turn, pulls the lug 19, the spring 25 being compressed during these movements. The movement of the lug 19 causes the tumbler 15 to rock downwardly around the axle 18. When the cam 17 reaches the position shown in FIG. 4 it encounters the surface of the end 16 of the tumbler 15, and, as the force applied has a direction which passes below the axle 10, the cam 17 carries round the tumbler 15, which, in contact with the stop 24, in turn carries along the whole of the lever.

FIG. 5 shows the position of the lever when the cam 17 has finished pushing the tumbler 15. The bottom of the part 6 has passed the locking bar 31, after having temporarily pressed it down in passing, and has pushed the rod-system bar 27, tensioning the spring 35. The movement of the bottom of the part 6 is limited by a stop 30, the position of the latter causing no interference with the cam 17.

As soon as the cam 17 has passed the tumbler 15, as shown in FIG. 6, the spring 35 pulls back the part 6 of the lever towards the locking bar 31, which holds the lever in the position shown. As mentioned above, as it turns, the lever carries along with it the axle 10, which closes the contact 47 which, in turn, closes an electric circuit setting in motion the electrical function corresponding to the configuration of the rod system put into operation by the lever. As will be seen subsequently, the closed contact 47 breaks the supply circuit of the electro-magnet 12 and that of the electric motor 37. Consequently the tumbler 15 is brought back to the rest position, as shown in FIG. 7, and the motor 37 stops the cam 17 in the position shown with a certain delay due to the inertia of the set of moving parts. In practice, the contact 47 is closed as soon as the lever reaches the position shown in FIG. 5, but acts only with a predetermined delay so that there shall be no danger of the cam 17 remaining in the rest position opposite a tumbler 15. The returning of the tumbler 15 to the rest position is done by the spring 25.

FIG. 8 shows a branch of part 6, seen from the rear. In its upper part this part includes the slot 13 and holes 49 in which are engaged the screws 7 and 8. The hole 26 and the projecting part 28 are also shown.

FIG. 9 shows the body 9, seen from the front, and having the cut-out part 14 and threaded holes 50 for the screws 7 and 8. The body 9 is also pierced right through at 51 and 52 to enable axles 10 and 18 to pass through it. Lastly, at the top rear one can see the cut-out 38 for the screw 39 to go through.

FIG. 10 shows a tumbler 15, seen from above, with, at the rear, a hollow 53 for accommodating the part 54 of the yoke 21 (FIG. 11). The tumbler 15 is pierced at 55 and 56 to allow the axle 18 and the lug 19 to pass through it. FIG. 11 shows a yoke 21, seen from above, with a threaded hole 57, in which is screwed the stem 22. The yoke also has a slit 20.

FIG. 12 shows, in axial cross-section, the camshaft 36 with its cams 58 to 61 working together, respectively, with the tumblers of levers 41 to 44, FIG. 3. FIG. 13 shows a cross-section of the shaft 36, along line XIII—XIII, revealing the cam 60, identical with cam 17.

The electrical circuit illustrated in FIG. 14 shows how the video tape recorder 1 is energised from the box 2. It contains a memory 62, the rest or operating state of which is controlled by the position of a manually operated OFF/ON switch A/M. The OFF contact of switch A/M is connected to input 63. It is kept at a voltage of +5V when the switch is in the ON position, the ON contact of switch A/M being connected to input 64 and the moving contact of the switch being earthed. The output 65 of the memory 62 is connected to the first input of a gate 66 with two inputs, the second of which is connected to a signal input 67. The gate 66 is an OR gate, the output of which is connected to the input 68 of a memory 69, the second input 70 of which is connected to the output of an operational amplifier 71 mounted as a voltage comparator. The output 72 of the memory 69 is connected in parallel to two power amplifiers 73 and 74, the respective outputs of which can energise relays 75 and 76, protected respectively by diodes 77 and 78.

The operation of the circuit in FIG. 14 is as follows: in order to turn the video tape recorder 1 on, by manual control, one has to actuate the switch A/M which applies earth to the input of the memory 62 which, in turn, delivers a signal to the gate 66 which activates the input 68 of the memory 69. The memory 69 delivers a signal, via the output 72, to the amplifiers 73 and 74, which actuate relays 75 and 76 to connect a power supply (not shown) to video tape recorder and placing the same in the operating condition. If the switch A/M is OFF, a signal applied via signal input 67 coming, for instance, from a terminal equipment such as that mentioned above is transmitted via the gate 66 to the input 68 of the memory 69 which operates as described above. Thus the input 67 makes it possible automatically to turn on the video tape recorder, in order, for instance, to record a television transmission. Generally the manual control A/M is used, rather, in order to prepare the playback of a transmission.

The operational amplifier 71 has one input connected to a reference voltage V while the other input is connected to an alarm signal input 79. When the input 79 is activated, the output of the amplifier 71 returns the memory 69 to the rest condition, which de-energizes 75 and 76 and causes the video tape recorder to return to the rest condition. An alarm signal is, for instance, provided by the video tape recorder when the tape of the cassette has remained around the reading head for too long without winding on.

The circuit shown in FIG. 15 is the control circuit of the electro-magnets 12 of the levers and of the motor 37. It includes the keyboard 5 associated with a logic selector 81. The keyboard 5 has a certain number of outputs to the selector 81 which converts the signals received by its outputs into one of four possible output signals delivered by the outputs 82, 83, 84 or 85. Each of the outputs 82 to 85 is connected to an input for putting into operation one of flipflops 86 to 89, the output of each of which is connected to an input for putting into operation a corresponding memory 90 to 93 and to the input of a corresponding amplifier 94 to 97. The outputs of the respective amplifiers 94 to 97 make it possible to supply power to a respective lamp 98 to 101. The outputs 82 to 84 of the selector 81 are still connected respectively to the three inputs of a logic circuit 102, the output of which is connected in parallel to the inhibit inputs of the memories 90 to 93. The logic circuit 102 delivers a signal when at least two of its inputs are simultaneously activated and serves the purpose, in practice, of preventing two of the levers 41 to 43 from being simultaneously actuated. On the other hand, the output 85, which corresponds to the record lever 44, is not connected to the logic circuit 102. Thus circuit 102 duplicates the safeguarding function provided by the rod system of the video tape recorder. Each one of memories 90 to 93 has one output connected to an amplifier 103 to 106 which can supply an electro-magnet 107 to 110, each of which corresponds, in fact, to electro-magnet 12 in FIG. 2. The electro-magnets 107 to 110 are protected respectively by diodes 111 to 114. Each of the memories 90 to 93 also has a second output connected to one of the four inputs of an OR gate 115 the output of which is connected to the input of a power amplifier 116 which can supply the motor 37.

Furthermore, the keyboard 5, which corresponds to the keyboard 5 in FIG. 1, has an output 117, corresponding to the stop key of the video tape recorder, which is connected, on the one hand, in parallel to the zeroing inputs of the flipflops 86 to 89, and, on the other hand, to a power amplifier 118 which can supply an electro-magnet 119, protected by a diode 120. The electro-magnet 119 serves the purpose of bringing the locking bar 31 back underneath the parts 6 in order to unlock them; it also can be actuated directly by the stop key 45 of the video tape recorder 1. Lastly, the contact 47, FIG. 3, is also connected, when it is closed, to the input of an amplifier 121 the output of which is connected in parallel to the zeroing inputs of the memories 90 to 93.

The circuit 81 is also connected to the remote control box 2 by a group of wires 80 which make it possible to carry out from the box 2 the same functions as from the control panel 5.

A description will now be given of the operation of the circuit of FIG. 15, assuming that it is desired to put the video tape recorder into the playback condition. The playback function is first keyed on the keyboard 5. The circuit 81 activates the output 84 which causes the flipflop 88 to pass to the operating position, thus causing the indicator 100 to light, via amplifier 96, and sets the memory 92 into the operating condition. The latter actuates the lever controlled by the electro-magnet 109, that is, the lever 43 (FIG. 3); it also activates the motor 37, via gate 115 and amplifier 116. As soon as the lever 43 is placed in the operating position, the contact 47 is closed, thus causing the memory 92 to be put in the rest condition. It should be noted that the lamp 100 remains lit, showing that the playback operation is in progress. In order to change to another function, the stop function is keyed, thus activating the output 117, which, via flipflop 88, extinguishes the indicator light 100 and activates the electro magnet 119 which unlocks the lever 43.

FIG. 16 shows schematically a lever with, above it, a head 122 of a key which is fixed on to the lever in a well known way. A head 122 can, for instance, be placed on a lever in order to constitute a key, such as key 40 or 45, including on a lever 41 to 44 making it possible to operate these levers directly by hand.

The lever and the head 122 can be moulded so as to form a single block. It is of course possible to employ for the lever a metal or a synthetic plastics material which is suitable to withstand the stresses involved.

It is understood that the embodiment which has just been described can also be applied to the control of an audio tape recorder and, if appropriate, to its remote control by means of special broadcast signals.

It should also be understood that although, in the example described, it has been assumed that the eject and stop keys are manually controlled, while the others are replaced by levers controlled by the keyboard 5, it is also possible to replace these to keys by levers, for instance where an automatic cassette changer is used with the video tape recorder 1.

We claim:

1. In a video/audio tape recorder whose individual functions are controlled by a rod system, means for controllably actuating said rod system comprising one or more L-shaped levers each having a normally horizontal arm and a normally vertical arm having an opening therethrough adjacent its upper end, an axle on said recorder pivotally mounting said levers for movement in a vertical plane, means actuating said rod system in response to movement of the vertical arm of a lever, and means controlling the movement of a vertical arm, said last means comprising a tumbler, means pivotally mounting said tumbler at its rear end on the horizontal arm of said lever below and parallel to said axle, said tumbler having a forward projection extending through the opening of said vertical arm, an electro-magnet having a plunger core, means mounting said electro-magnet rearwardly of and to the said horizontal arm of said lever with the plunger core extending forwardly toward said tumbler below the pivotal axis thereof, means interconnecting the end of said plunger to said tumbler whereby said tumbler is rotated downwardly about its axis in response to energization of said electro-magnet, a cam shaft having one or more cams, means on said recorder rotatably mounting said cam shaft for movement about an axis parallel to the axis of said tumbler and below the forward projecting thereof, means for driving said cam shaft, spring means normally maintaining the forward projection of said tumbler out of the path of said cam, the spacing of the cams from said forward projection being such that when said tumbler is rotated downwardly under the action of said electro-magnet it is in the path of and engageable by one of the cams on said cam shaft, means simultaneously energizing said driving means and said electro-magnet, whereby upon downward movement of said tumbler and rotation of said cam shaft, a cam engages said tumbler and rotates said lever rearwardly upon its axle and actuates said rod system for initiating a function of the tape recorder, means locking the rotated lever in its actuating position, means de-energizing said driving means and said electro-magnet after said lever has been locked in its actuating position and the cam has passed out of engagement with said tumbler, whereby said tumbler is returned to its initial position under the action of said spring means, means disengaging said locking means, and second spring means for returning said lever, said shaft and said actuating means to their initial position.

2. In a video/audio tape recorder according to claim 1, the combination of means controlling said electro-magnet energizing means for insuring that energization occurs solely during the period between initial contact of the cam with the tumbler and locking of the lever in the operating position.

3. In a video/audio tape recorder according to claim 1, in which the means for de-energizing said driving means comprises a stop circuit, in combination with means mounting each lever on said axle with a predetermined amount of play, whereby movement of one lever rotates said axle without causing movement of another lever, a fixed contact in said stop circuit, and a moveable contact in said stop circuit on said axle and so positioned thereon to engage said fixed contact when a lever has reached it operative position, whereby energization of the corresponding electro-magnet corresponds to one revolution of said cam.

4. In a video/audio tape recorder according to claim 3, in which the means disengaging said locking means is effected by closure of said stop circuit.

* * * * *